United States Patent [19]
Kraus et al.

[11] Patent Number: 5,765,989
[45] Date of Patent: Jun. 16, 1998

[54] METHOD AND APPARATUS FOR THE AUTOMATIC PROVISION OF A SHEET STACK FOR A PRINTING MACHINE

[75] Inventors: Hans-Peter Kraus, Donzdorf; Martin Benz, Treffelhausen; Hermann-Josef Falkenstein, Goppingen, all of Germany

[73] Assignee: MAN Roland Druckmaschinen AG, Germany

[21] Appl. No.: 446,284

[22] Filed: May 22, 1995

[30] Foreign Application Priority Data

May 20, 1994 [DE] Germany ............ 44 17 806.9

[51] Int. Cl.[6] ............................................. B65G 67/00
[52] U.S. Cl. .................... 414/799; 414/928; 414/929; 414/416
[58] Field of Search ................... 414/416, 754, 414/782, 783, 784, 927, 928, 929

[56] References Cited

U.S. PATENT DOCUMENTS

| | | | |
|---|---|---|---|
| 3,123,232 | 3/1964 | Postlewaite | 414/416 |
| 3,499,560 | 3/1970 | Le Gros | 414/799 |
| 5,052,876 | 10/1991 | Tateno et al. | 414/416 |
| 5,118,243 | 6/1992 | Hubner et al. | 414/929 |

FOREIGN PATENT DOCUMENTS

| | | | |
|---|---|---|---|
| GM6 806 842 | 7/1969 | Germany . | |
| OS40 13 172 | 10/1991 | Germany . | |
| 201730 | 9/1987 | Japan | 414/928 |

*Primary Examiner*—Karen B. Merritt
*Assistant Examiner*—Gregory A. Morse
*Attorney, Agent, or Firm*—Leydig, Voit & Mayer, Ltd.

[57] ABSTRACT

A method and apparatus for preparing a sheet stack for automated processing in a sheet-fed machine; comprising manipulating a sheet stack and transportation pallet to a release position; removing the transportation pallet, and placing a system pallet adjacent the sheet stack so that it is ready for further processing. The apparatus includes structure performing these functions.

16 Claims, 7 Drawing Sheets

METHOD AND APPARATUS FOR THE AUTOMATIC PROVISION OF A SHEET STACK FOR A PRINTING MACHINE

FIELD OF THE INVENTION

The invention relates generally to sheet-processing machines, and more particularly to a method and apparatus for preparing a sheet stack for processing in a sheet-processing machine.

BACKGROUND OF THE INVENTION

Printing matter (e.g. paper stacks) has to be provided in order to prepare a printing machine for printing. For this purpose, many types of automated systems have been developed both for sheet-fed printing machines and for web-fed printing machines. In order that a sheet-fed printing machine can be operated without friction or interruptions, it is known, for example, to equip the feeder with non-stop devices. These non-stop devices contain transportation devices for handling new sheet stacks before printing and removing empty pallets afterwards. There is often the problem, however, in that a transportation pallet which is used for transportation during the delivery of the paper may not be suitable for handling in the non-stop device on the feeder. Consequently, use is made of special system pallets which are of a known and predetermined size, and ensure the necessary precision of the stack guidance and the operational reliability of the device. Up until now, the sheet stack has had to be changed manually from so-called transportation pallets onto the system pallets. Typically, this has been performed by rotating the stack through 180 degrees with the aid of a so-called stackturning device, so that the stack has been upended and the transportation pallet, then located at the top, can be manually raised off and replaced by a system pallet. This has meant heavy work in the case of stacks reaching a height of 1.60 m and pallets weighing up to 30 kg. Moreover, the empty pallets still had to be transported to a set-down location.

SUMMARY OF THE INVENTION

The general aim of the invention is to simplify the preparation of the sheet stack for processing in a sheet-processing machine.

In accordance with that aim, it is a primary object of the invention to provide a process and apparatus for preparing a sheet stack for processing in a sheet-processing machine which replaces manual operations and permits automatic pallet exchange for preparing a sheet stack for the automated feeding of sheet-processing machines.

In accordance with this and other objects of the invention, there is provided a method wherein a transportation stack comprising a transportation pallet and a sheet stack is manipulated such that the transportation pallet is removed and replaced by system pallet, such that the resulting sheet stack and system pallet are then ready for further processing. The removed transportation pallets are collected in a used pallet receptacle. An apparatus according to the invention is also provided and includes a stack manipulator for moving the transportation stack to a release position and for freeing the transportation pallet from the sheet stack. The apparatus also includes a handling unit which is moveable relative to the stack manipulator and includes a clamping mechanism for gripping the freed transportation pallets, so that the handling unit can move them to a used pallet receptacle. The handling unit is also adapted to retrieve an empty system pallet from a system pallet supply receptacle and move it to a position adjacent the sheet stack.

The advantage is that the undesirable transportation pallet is discharged out of the sheet-processing operation over a short path, it not being necessary for the transportation pallet to be handled manually. Additional features and advantages will be apparent from the following specification and claims.

BRIEF DESCRIPTION OF THE DRAWINGS

The invention is described in more detail with reference to certain preferred embodiments, as shown in the drawings, in which.

DETAILED DESCRIPTION OF THE PREFERRED EMBODIMENTS

In the method according to the invention, a system pallet is substituted for a transportation pallet associated with a sheet stack, to allow subsequent processing of the sheet stack. A transportation stack (comprised of a transportation pallet and the sheet stack) is first manipulated into a release position, wherein the transportation pallet is freed to move relative to the sheet stack. This release position may either be a position where the transportation stack is completely inverted, or it may be an oblique horizontal position. The transportation pallet is then moved away from the sheet stack and deposited on a used pallet receptacle. In order that the pallets in the used pallet receptacle are properly oriented to later receive a new sheet stack, they may be rotated as they are moved from the sheet stack to the used pallet receptacle. Following removal of the transportation pallet from the sheet stack, a system pallet is placed adjacent the sheet stack to form a system stack. The resulting system stack is then ready for further processing.

Figure 1:
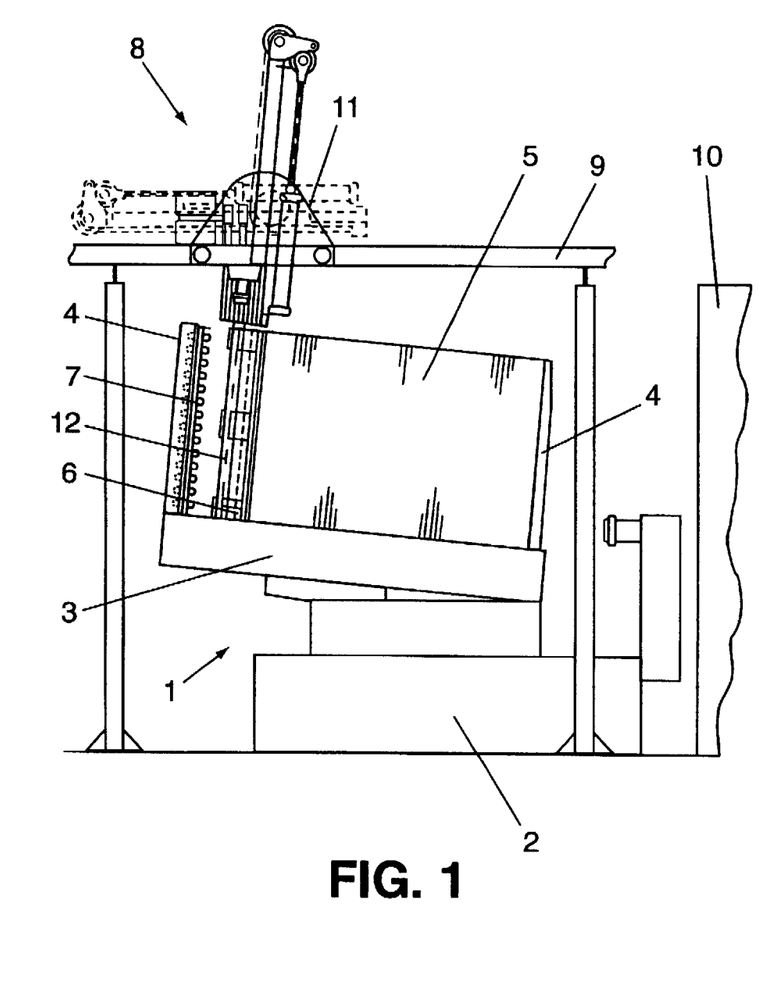
FIG. 1 shows an overview of the stack manipulator and handling apparatus according to one embodiment of the invention.
Figure 2:
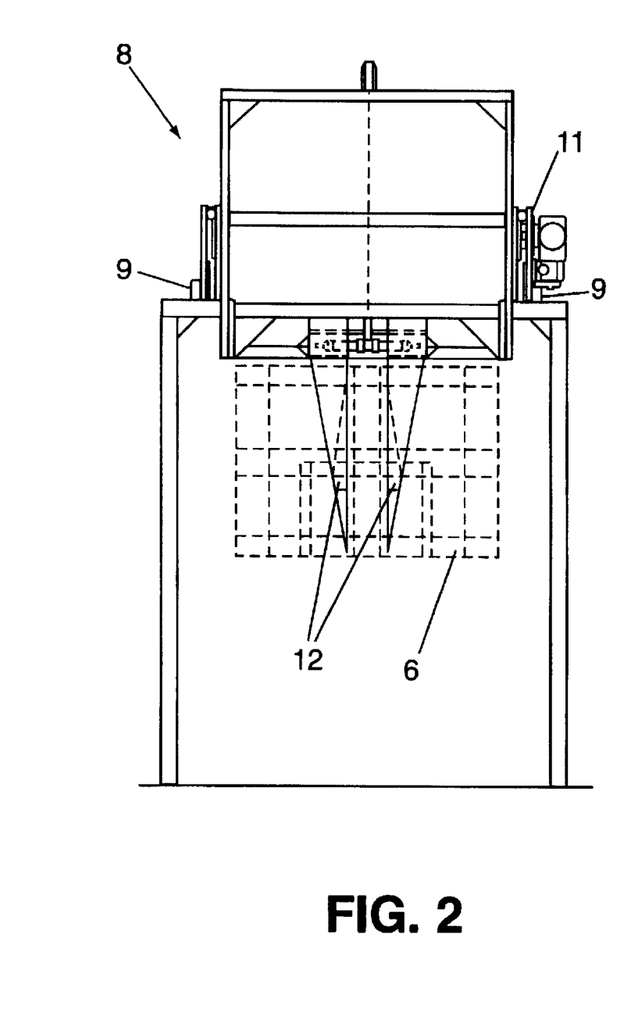
FIG. 2 shows a side view of the apparatus of FIG. 1.
Figure 13:
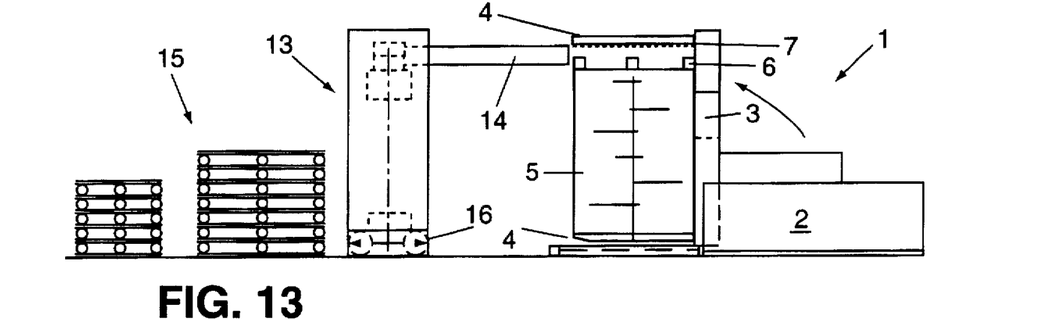
FIGS. 13 to 16 show schematic representations in order to illustrate the way in which a method in accordance with another embodiment of the invention proceeds.

To manipulate the transportation stack, according to a first embodiment of the invention, a stack manipulator in the form of a stack-turning device 1 is used. The stack-turning device 1 is shown in FIGS. 1 and 2. Stack-turning device 1 comprises a displaceable base 2, and a carrying arm 3 which is arranged pivotally on the base 2. To grip a sheet stack and any associated pallets, the carrying arm 3 is provided with two gripping plates 4 which are seated perpendicularly on the carrying arm 3 at each longitudinal end. The gripping plates 4, which may be of a fork-shaped design, are displaced relative to one another in the longitudinal direction to clamp the sheet stack and pallet(s). To provide for manipulation of a sheet stack once it is clamped by the gripping plates 4, the carrying arm 3 may be pivoted relative to base 2 both about an axis located in the plane of displacement of the gripping plates 4 (and symmetrical with respect thereto), and about a second axis located perpendicularly and symmetrically with respect to the first axis. As a result, the gripping plates 4 and a sheet stack 5 and any pallets clamped there between may be pivoted from a position like that shown in FIG. 4 to a position like that shown in FIG. 10, and then optionally rotated about the then-vertical axis arranged between the gripping plates. By virtue of this arrangement a sheet stack and pallets clamped between the gripping plates 4 may either be pivoted from a vertical orientation into a substantially horizontal orientation like those shown either in FIG. 1 or FIG. 10 or the sheet stack and pallets may be completely up-ended. An up-ended sheet stack with the pallets shown on top of the stack is seen in FIG. 13.

According to the present embodiment, the stack-turning device's is used to pivot the sheet stack 5 and an associated transportation pallet (a transportation stack) to a substantially horizontal position as shown in FIG. 1, and referred to herein as the release position. This is the position in which the transportation pallet is removed from the sheet stack so that the transportation pallet will not interfere with later processing of the sheet stack. In this embodiment, the transportation stack is pivoted to the release position by means of the stack-turning device's rotating it to slightly beyond horizontal, to an oblique horizontal position illustratively 95° from the vertical. As can further be seen from FIG. 1, and according to the present embodiment, the transportation stack is seated on a system pallet 7. In this embodiment, the system pallet 7, in place beneath the transportation stack, is initially releasably connected to the lower gripping plate 4 of the stack-turning device before the stack-turning device grips the transportation stack and system pallet to rotate them to the position shown in FIG. 1. In an alternative embodiment, discussed in greater detail below, the system pallet 7 may not be initially in place beneath the transportation stack, but a system pallet 7 is rather placed adjacent to the sheet stack 5 at a later point in the process, such as when the transportation pallet has already been removed. In the present embodiment, however, the system pallet is initially in place beneath the transportation stack, and both are rotated to the release position, for example, by the lower gripping plate 4 being in the form of a fork, and engaging into clearances in the system pallet 7.

With the transportation stack and system pallet 7 in the release position, the grip of the gripping plates 4 on the resulting stack is released in order to free the transportation pallet 6 from the transportation stack. According to the invention, the transportation pallet 6 is then moved away from the sheet stack 5 and deposited in a used pallet receptacle located in a separate location from the sheet stack 5 and stack turning device 1.

In the present embodiment, the used pallet receptacle is in the form of a used pallet magazine 10 adapted to receive the pallets. However, and according to the invention, other used pallet receptacles could be used so long as they serve the function of receiving used transportation pallets. In its simplest embodiment, the used pallet receptacle could, for example, simply be a stack of used pallets disposed at a given location relative to the stack manipulator.

To remove and subsequently manipulate the freed transportation pallet, a pallet manipulator in the form of a handling unit 8 is provided (see FIGS. 1–2). The handling unit 8 is movable relative to the stack-turning device 1 along rails 9. Rails 9 are arranged parallel to the longitudinal axis of the stack-turning device 1, and are arranged above the operating area thereof. Also shown in FIG. 1 is the used pallet magazine 10 which receives the transportation pallets 6 after they have been removed from the sheet stack 5, and conveyed to the used pallet magazine 10 by handling unit 8. To provide for movement of the handling unit 8 along the rails 9, an undercarriage 11 seated on rails 9 is provided. Undercarriage 11 thus permits movement of the handling unit between the stack-turning device 1 and the used pallet magazine 10. The handling unit 8 is further pivotally attached to the undercarriage 11, and includes a clamping mechanism 12 for gripping the pallets. In addition, the clamping mechanism 12 can be moved linearly along the handling unit 8. This allows the clamping mechanism 12 to grip the transportation pallet 6 and withdraw it and move it away from the sheet stack 5, thus clearing the sheet stack 5 for subsequent movement of the transportation pallet 6.

Figure 3:
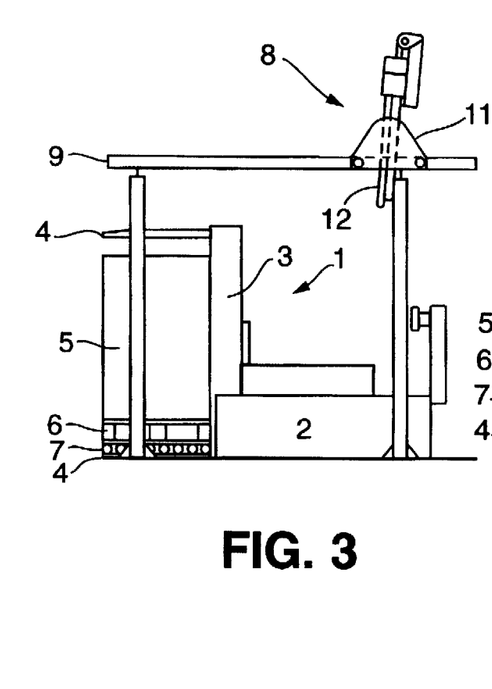
FIGS. 3 to 12 show schematic representations in order to illustrate the way in which a method in accordance with an embodiment of the invention proceeds.
Figure 4:
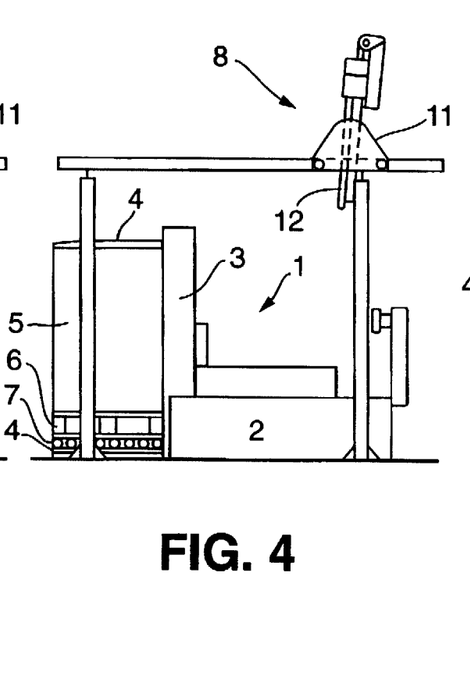
Figure 5:
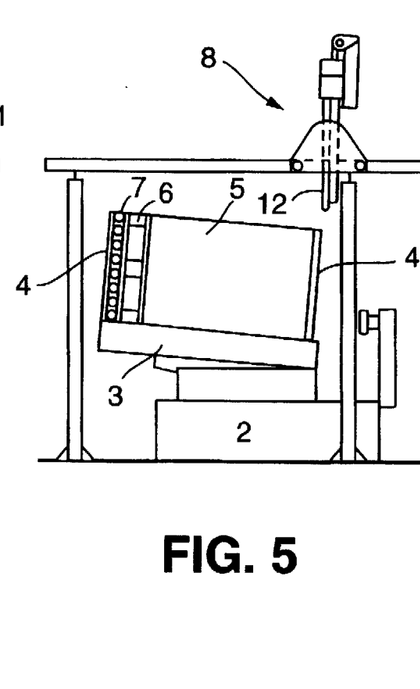
Figure 6:
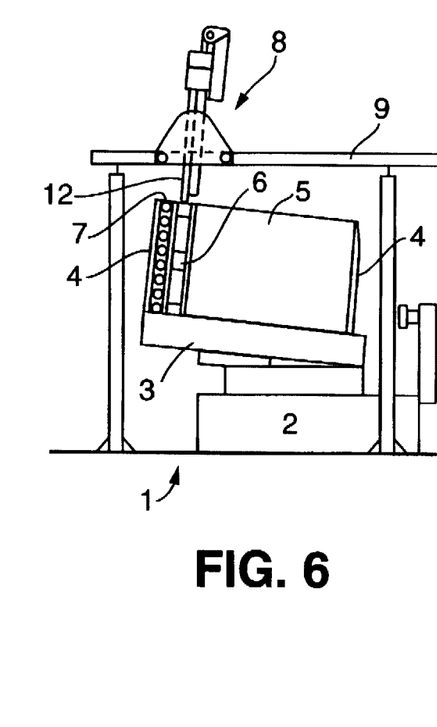
Figure 7:
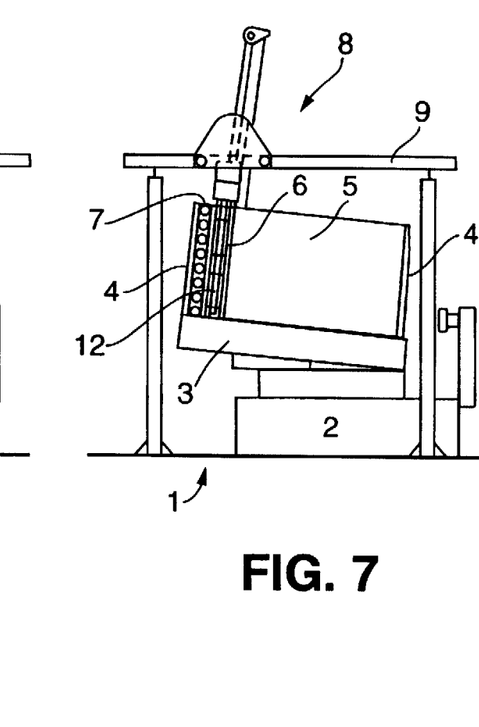
Figure 8:
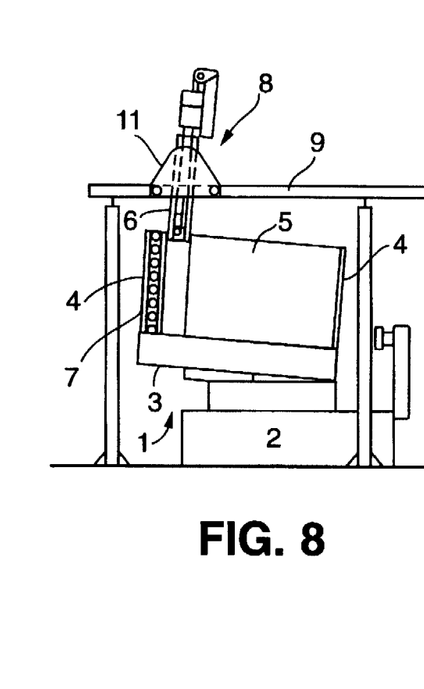

As the structure and function of the stack-turning device 1 and the handling unit 8 have been described, an exemplary method according to the invention will now be described in greater detail with reference to FIGS. 3–12. For preparing a sheet stack to be processed in a printing machine (such sheet stack typically being provided on a transportation pallet) it is necessary to change it from a transportation pallet onto a system pallet which can be used in the feeder of a printing machine. According to the invention, this is achieved by the transportation stack being clamped and tilted to a release position, the transportation pallet being freed, removed from the sheet stack and set down, and the sheet stack 5 being deposited onto a system pallet 7 for subsequent processing. In the present embodiment of the process, this is achieved by the transportation stack initially being deposited on a system pallet 7. The transportation stack and system pallet are both rotated to the release position, where the transportation pallet is removed and set aside in the used pallet magazine 10 by the handling unit 8. The gripping arms 4 of the stack-turning device 1 are then actuated to place the system pallet 7 adjacent to sheet stack 1. The resulting stack is then pivoted back to a vertical orientation for further processing by the machine. A detailed description of this method follows:

In FIG. 3, sheet stack 5 is shown in place on the transportation pallet 6, and in turn on the system pallet 7. The lower gripping arm 4 engages the system pallet 7. In FIG. 4, the sheet stack 5 and transportation pallet 6 and system pallet 7 are clamped between gripping plates 4 of the stack-turning device 1. In FIG. 5, the carrying arm 3, the transportation stack and the system pallet 7 are tilted on the stack-turning device 1 out of the vertical and into an oblique horizontal position of approximately 95° from vertical. This is the release position of this embodiment. As shown in FIG. 6, the handling unit 8 then moves on the rail 9 from a rest position into the removal position over the tilted sheet stack 5. In FIG. 7, the clamping mechanism 12 of the handling unit 8 grips the transportation pallet 6 while it is still clamped in together with the sheet stack 5 between the gripping plates 4. At this point, the grip imposed upon the sheet stack and pallets by the gripping plates 4 is released such that the transportation pallet 6 becomes freed. These two steps could be performed in the reverse order, i.e. release of the grip by the press-on arms preceding the gripping of the transportation pallet by the clamping mechanism. In FIG. 8, the handling unit 8 moves the transportation pallet 6 away from the stack surface and moves it completely out of the stack region. By virtue of the slight oblique release position (95° past the vertical) of the carry arm 3, the paper sheets of the stack remain in position.

Figure 9:
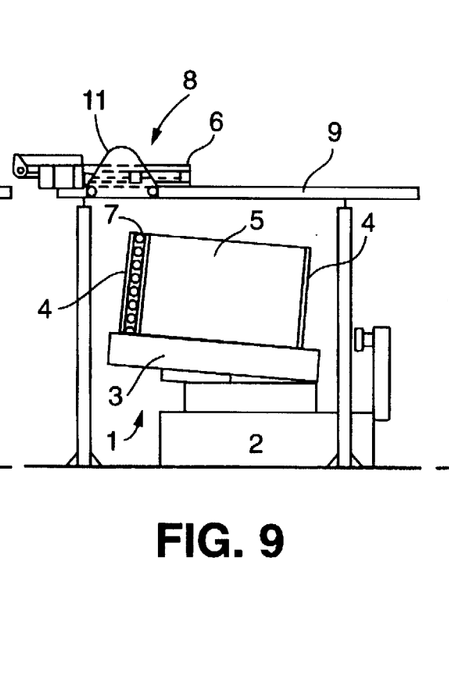
Figure 10:
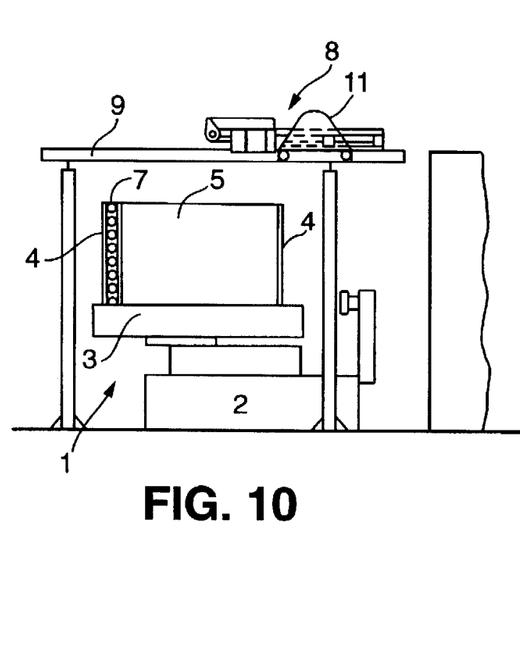
Figure 11:
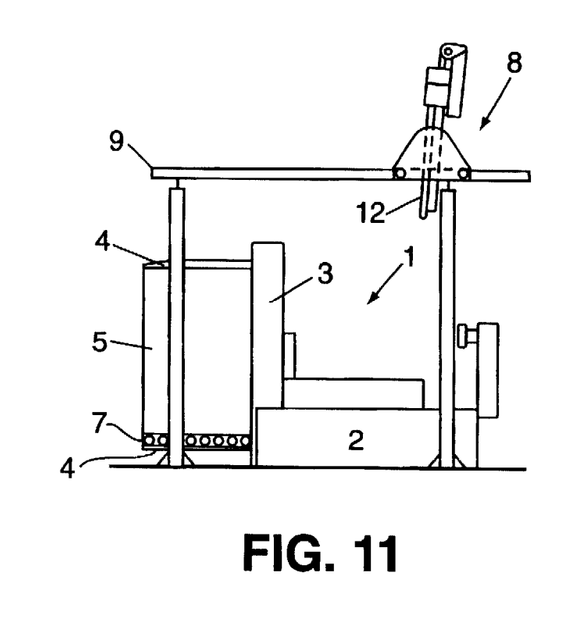
Figure 12:
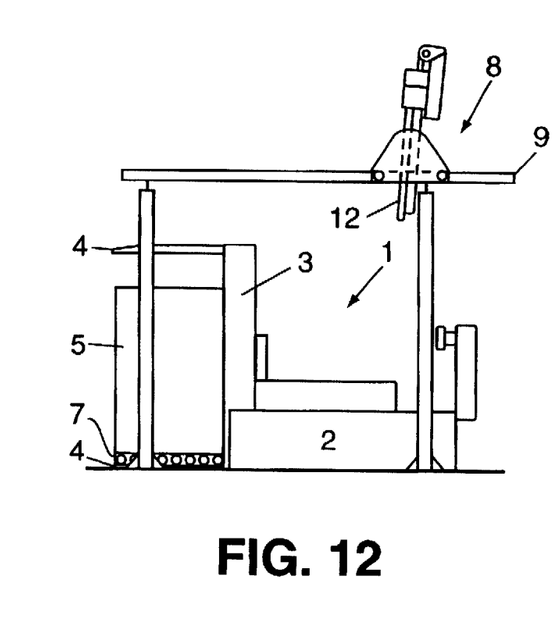

In FIG. 9, handling unit 8 pivots the clamping mechanism 12 with the transportation pallet 6 attached, such that the transportation pallet is moved into a horizontal orientation. By virtue of this maneuver, the transportation pallet 6 is moved into an orientation wherein the surface which is adapted for receiving a sheet stack is directed upwardly. Since the pallet 6 will be received on a used pallet magazine 10, this insures that the pallet 6 will be properly oriented for receiving a further sheet stack when it is reused upon removal from the receptacle. As is further shown in FIG. 9, the gripping plates 4 for clamping the sheet stack 5 are moved towards one another along with the system pallet 7, thus placing the system pallet 7 adjacent to sheet stack 5. In FIG. 10, the handling unit 8 is shown moving with the transportation pallet 6 to the used pallet magazine 10. At the same time, the carry arm 3 is pivoted with the sheet stack 5 into a horizontal orientation. At this position, the sheet stack may be subjected to vibration, supplied with air and aligned. Stack manipulator 1 would include the necessary devices to perform this function. In FIG. 11, the sheet stack 5 is again clamped by the gripping arms 4 and tilted back into its vertical orientation. The handling unit 8 may also be pivoted upwards and moved into the rest position. In FIG. 12, the sheet stack 5 is freed by the stack-turning device and can be transported on its system pallet 7 to the sheet processing machine for automatic processing.

Accordingly, the method and apparatus of the invention prepare the sheet stack 5 for subsequent automatic processing in a sheet-processing machine, e.g. a sheet-fed printing machine. The transportation pallets 6 are removed without manual intervention and are made available for re-use in the used pallet magazine 10. By virtue of the configuration of the system, the transportation pallets 6 are automatically set down on the correct side, i.e. with the upper side at the top. This use of the stack-turning device 1 also makes it possible to combine the functions of pallet exchange with the functions of loosening stacks, supplying them with air and aligning them. Optimum preparation for further processing is thus possible.

The functioning of an alternative embodiment of the apparatus and the associated method is shown in FIGS. 13 to 16.

The apparatus of this embodiment also includes a stack-turning device 1 with its associated elements. Arranged opposite the stack-turning device 1 is a handling unit 13 which can be displaced in the direction of the stack-turning device 1. Handling unit 13 includes a clamping mechanism 14 which is fitted on an extension arm and can be displaced in the longitudinal direction at least over the distance of the longest extent of a transportation pallet 6. A used pallet receptacle in the form of a used pallet stack 15 for unloaded empty transportation pallets 6 is provided downstream of the handling unit 13.

This embodiment differs from the previous embodiment primarily in that the sheet stack 5 and associated pallets are inverted in the release position as opposed to being in a slightly oblique (950°) horizontal position as in the previous embodiment.

Figure 14:
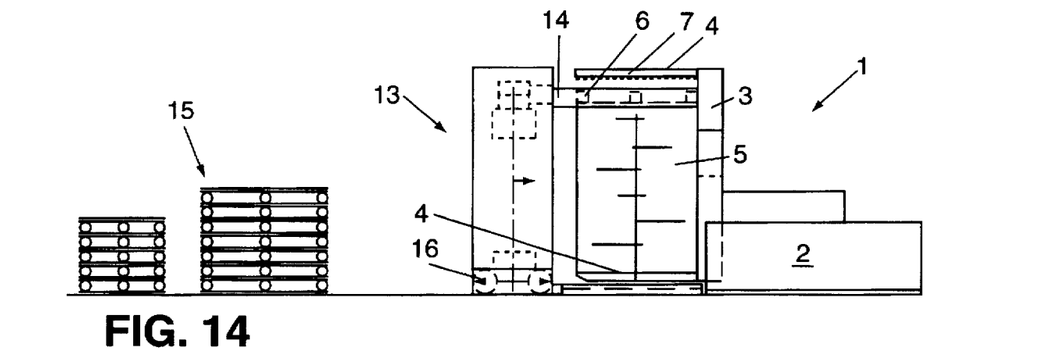
Figure 15:
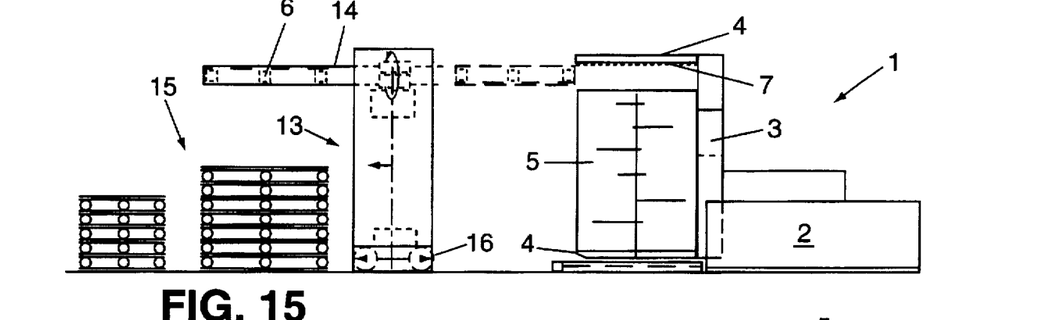
Figure 16:
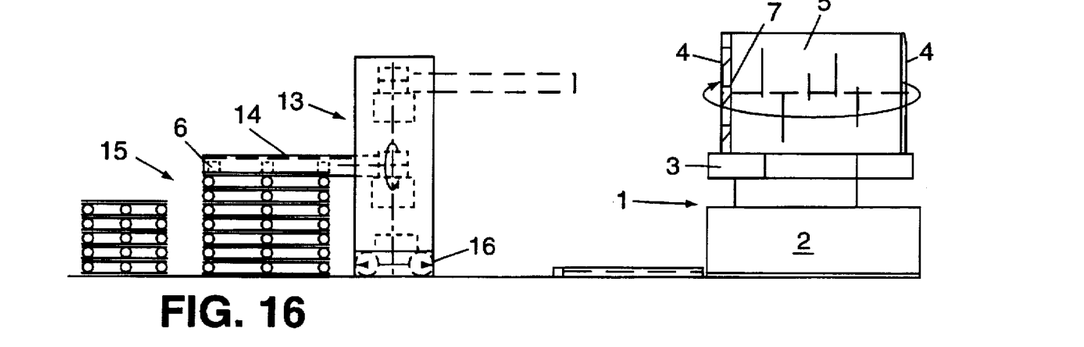

The way in which the method proceeds for this apparatus is illustrated hereinbelow with reference to FIGS. 13 to 16. In FIG. 13, the sheet stack 5 is clamped fixedly with the transportation pallet 6 and the system pallet 7 between the gripping plates 4 of the stack-turning device. The stack-turning device then upends the stack to the position of FIG. 13. Thereafter, the top gripping plate 4 is raised to free the transportation pallet 6. In FIG. 14, the handling unit 13 and clamping mechanism 14 move out of the rest position into the removal position adjacent the tilted sheet stack 5. In FIG. 15, the handling unit 13 moves the transportation pallet 6 away from the stack surface and moves it out of the stack region. In FIG. 16, the handling unit 13 pivots the transportation pallet 6 to the correct side (if required) and deposits it on the used pallet stack 15. There, provision may be made for storage of pallets of different sizes, which are charged correspondingly. At the same time, the sheet stack 5 is clamped with the system pallet 7 and the carrying arm 3 is pivoted such that the sheet stack 5 is in the horizontal position. In this position, it can be aligned, subjected to vibration and supplied with air. Thereafter, the sheet stack 5 can be clamped in again, pivoted, tilted back into the vertical and, seated on the system pallet 7, freed by the stack-turning device 1. It is then ready for automatic processing in a sheet-processing machine.

This alternative embodiment of the apparatus is suitable for areas where there is no problem with space, since it does take up more space, but, at the same time, provides a relatively simpler method for manipulating the transportation pallets. Moreover, stack handling is somewhat simpler and may also be more reliable. For example, it may be better suited for processing thin paper.

In a potential alternative to this embodiment, the handling unit 13 is arranged in a stationary manner. For this purpose, it may then be possible for the clamping mechanism 14 to be extended with the respect to the stack-turning device 1 such that it can remove the transportation pallet 6 from the sheet stack 5 in the stack-turning device 1.

In the previous embodiments, a system pallet 7 was initially in place beneath the transportation stack prior to manipulation by the stack manipulator. According to an alternative embodiment, however, the system pallet may be placed adjacent the sheet stack 5 later in the process. The handling unit (either unit 8 from FIGS. 1–12, or unit 13 from FIGS. 13–16) is adapted in the embodiment to retrieve an empty system pallet from a system pallet supply receptacle, and to place the system pallet adjacent sheet stack 5 some time after the sheet stack 5 is already in the release position. The system pallet supply receptacle may simply be a stack of empty system pallets disposed at a given location. Alternatively a system pallet supply magazine may be provided. The placement of the system pallet 7 adjacent the sheet stack 5 can take place before or after the transportation pallet is removed, depending on the process selected.

Figure 17:
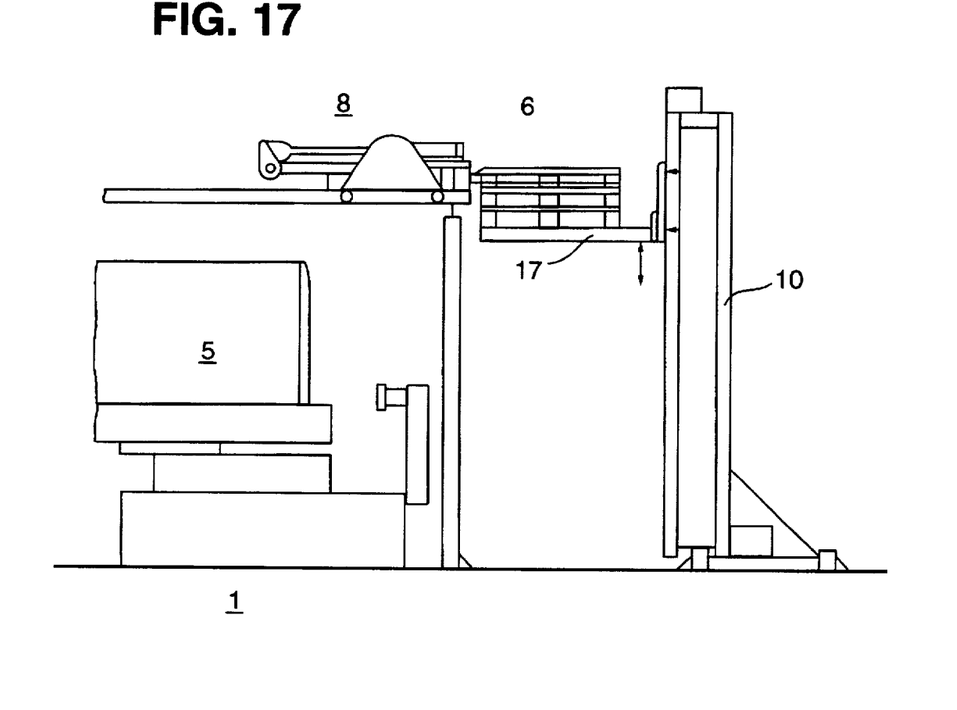
FIGS. 17 and 18 show two views of a controllable, multi-stage pallet store according to an embodiment of the invention.
Figure 18:
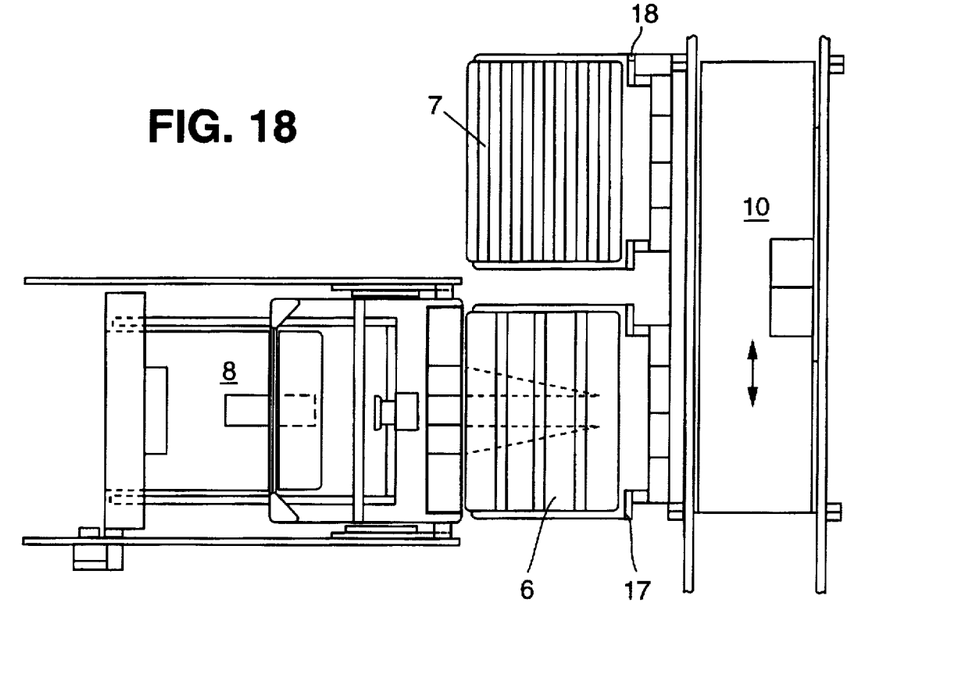

In either case, and according to a further embodiment of the invention, an automated pallet store, may be included. Such a device is represented in FIGS. 17 and 18. The automated pallet store includes both the used pallet receptacle and the system pallet supply receptacle, respectively, in the form of individual pallet-receiving means 17, 18. The pallet-receiving means 17, 18 can be displaced vertically and can thus be set to the operating height of either handling unit 8, 13. Moreover, the entire automated pallet store can be displaced in the direction of the double-headed arrow in FIG. 18 with respect to the handling units 8, 13 with the result that the pallet-receiving means 17, 18 required in each case can be moved to be adjacent to the handling units 8, 13 as the method may require at a given time.

It will be appreciated by one skilled in the art that various modifications may be made to the methods and devices for carrying out the same and described herein without departing from the scope of the invention. For example, a stack manipulator, other than the stack-turning device described, may be advantageously used. Accordingly, the invention should not be considered to be limited to the embodiments herein. Rather, it should be considered to cover all modifications and equivalents as are included within the scope of the appended claims.

What is claimed is:

1. A method for removing a transportation pallet from a transportation stack, comprising the transportation pallet and a sheet stack, for subsequent processing of the sheet stack in a printing machine, comprising the steps of:

(a) gripping the transportation stack and moving it to a release position;

(b) freeing the transportation pallet from the transportation stack by releasing the grip;

(c) vibrating and aligning the sheets of the stack for subsequent processing in the printing machine while freed from the transportation pallet;

(d) removing the freed transportation pallet from the sheet stack;

(e) moving the transportation pallet away from the sheet stack to a used pallet receptacle and depositing the transportation pallet there;

(f) moving a system pallet into engagement with the sheet stack; and (g) gripping the system pallet and sheet stack and moving them for further processing in the printing machine.

2. The method according to claim 1, wherein the transportation stack is moved to the release position by a stack manipulator gripping the stack and including the step of inverting the transportation stack such that the transportation pallet lies on top of the sheet stack, the stack manipulator freeing the transportation pallet from the sheet stack by releasing the grip, and wherein a handling unit subsequently removes the freed transportation pallet from the sheet stack.

3. The method of claim 1, wherein the transportation stack is moved to the release position by a stack manipulator gripping the stack, and including the step of tilting the transportation stack past the horizontal to an oblique position approximately 95° from the vertical, the stack manipulator freeing the transportation pallet by releasing the grip, and wherein a handling unit withdraws the transportation pallet out of the transportation stack.

4. The method of claim 1, including a handling unit, and wherein the step of moving a system pallet into engagement with the sheet stack to form a system stack comprises retrieving an empty system pallet with the handling unit and positioning the system pallet adjacent the sheet stack.

5. An apparatus for removing a transportation pallet from a transportation stack including the transportation pallet and a sheet stack, and replacing the transportation pallet with a system pallet for processing by a printing machine, the apparatus comprising, in combination:

(a) a stack manipulator including gripping arms for gripping the transportation stack, the stack manipulator including means to move the transportation stack to a release position; and means for releasing the grip and freeing the transportation pallet from the sheet stack;

(b) a handling unit separate from said stack manipulator including a clamping mechanism for gripping pallets, the handling unit being mounted for movement relative to the stack manipulator, (c) a used pallet receptacle for receiving empty transportation pallets;

(d) a system pallet supply receptacle for retaining empty system pallets, said handling unit being movable relative to the stack manipulator to enable said clamping mechanism to grip a freed transportation pallet and then to move the freed transportation pallet to the used pallet receptacle and to further enable the said clamping mechanism to grip system pallets and to move the gripped system pallet from the system pallet supply receptacle to adjacent the sheet stack.

6. The apparatus according to claim 5, wherein the handling unit is disposed beside the stack manipulator at ground level and is displaceable linearly relative to the stack manipulator; the clamping mechanism being rotatable relative to the handling unit about a horizontal axis for properly orienting a removed transportation pallet before placing the pallet on the used pallet receptacle, and wherein the handling unit is pivotable about a vertical axis.

7. The apparatus according to claim 6, wherein the handling unit includes a framework fixedly disposed at ground level, the clamping mechanism being vertically movable relative to the handling unit.

8. The apparatus according to claim 5 including an automated pallet store, and wherein the used pallet receptacle and the system pallet supply receptacle are first and second vertically displaceable pallet-receiving devices disposed on the automated pallet store for receiving the used transportation pallets and the empty supply pallets, respectively.

9. The apparatus according to claim 8, wherein the automated pallet store is displaceable relative to the handling unit whereby the first and second vertically displaceable pallet-receiving devices can alternatively be placed adjacent to the handling unit.

10. The apparatus of claim 5, including rails disposed above the stack manipulator, the handling unit being movable along the rails, the clamping mechanism also being linearly movably coupled relative to the handling unit, and wherein the clamping mechanism is pivotable relative to the handling unit about a horizontal axis for properly orienting a removed transportation pallet before placing the pallet on the used pallet receptacle.

11. The apparatus of claim 5, wherein the stack manipulator includes a base, and a carrying arm pivotally mounted to the base; the carrying arm including opposed gripping plates disposed perpendicularly to the carrying arm and displaceable longitudinally along the carry arm, the carrying arm being pivotable about a horizontal axis and pivotable about an axis perpendicular to the carrying arm.

12. The apparatus according to claim 5, including an automated pallet store, and wherein the used pallet receptacle is a vertically displaceable pallet-receiving device for receiving the freed transportation pallets.

13. An apparatus for removing a transport pallet from a sheet stack for processing of the sheet stack in a printing machine comprising a stack turning device for gripping the sheet stack and transport pallet, turning the sheet stack and transport pallet to a rotated position, and releasing the transport pallet and sheet stack to free the transport pallet; and a transport pallet handling device separate from said sheet stack turning device for clamping the transport pallet, removing the transport pallet from the sheet stack, transporting the transport pallet to a storage location, and unclamping the transport pallet at the storage location.

14. The apparatus of claim 13 in which said transport pallet handling device is movable in a linear direction relative to the stack turning device during transport of said removed transport pallet to said storage location.

15. The method for removing a transport pallet from a sheet stack for processing of the sheet stack in a printing machine on a system pallet comprising grasping the sheet stack while positioned on a transport pallet, turning the sheet stack and transport pallet to a rotated position by a stack turning device, freeing the transport pallet from the sheet stack while in the rotated position, gripping and removing the transport pallet from the sheet stack while in the rotated position by means of a pallet handling unit separate and apart from the stack turning device, positioning the sheet stack on a system pallet, moving the transport pallet gripped by the pallet handling unit to a storage location, ungripping the transport pallet at the storage location, and transporting the sheet stack and system pallet for processing of the sheet stack in the printing machine.

16. The method of claim 15 including transporting the removed transport pallet to a storage location by moving the pallet handling unit in a linear direction relative to the stack turning device.

* * * * *